Patented Dec. 17, 1946

2,412,801

UNITED STATES PATENT OFFICE 2,412,801

A DIARYLGUANIDINE THIAZOLE FORMALDEHYDE COMPLEX AND THE PROCESS FOR MAKING THE SAME

Arnold R. Davis, Riverside, Conn., assignor to American Cyanamid Company, New York, N. Y., a corporation of Maine No Drawing. Application May 8, 1943, Serial No. 486,205

10 Claims. (Cl. 260—299)

This invention relates to complexes produced by reacting diarylguanidine-zinc chloride adducts with formaldehyde and a substance selected from the group consisting of mercaptobenzothiazole, benzothiazole disulfide and mercaptothiazoline.

This invention is more specifically illustrated by the following examples, in which parts are given by weight. The invention is not restricted to the specific details set forth in the examples.

The diarylguanidine-zinc chloride adducts which are used for the preparation of these new compounds, may be made in any suitable manner as set forth in the examples or in accordance with the disclosures of my Patents Nos. 2,259,063, 2,259,064 and 2,259,414, all issued October 14, 1941.

Example 1

Methylol mercaptobenzothiazole may be prepared in any desired manner, as by boiling a mixture of mercaptobenzothiazole with a slight excess over the molecular equivalent of aqueous formaldehyde solution, with or without the addition of alcohol, the methylol mercaptobenzothiazole crystallizing out of the solution on cooling. 591 parts of methylol mercaptobenzothiazole was mixed with 307 parts of $(DOTG)_2.ZnCl_2$ (diorthotolylguanidine-zinc chloride adduct) in a suitable container and the mixture was gradually heated until it fused. At 80° C. the mass became a clear, viscous straw-colored liquid. This fusion product was solid at room temperature and thin films thereof were clear. This resinous reaction product had a softening point of about 70° C.

Example 2

A mixture was prepared of the following materials:

| | Parts |
|---|---|
| $(DOTG)_2.ZnCl_2$ | 614 |
| Paraformaldehyde | 180 |
| Mercaptobenzothiazole | 1002 |

This mixture was heated together in a suitable vessel at 70–80° C. for about 30 minutes until a yellow paste was formed. The temperature of the mass was raised to 90–100° C. and heating was continued at that temperature for about 15 minutes at which time the paste began to convert to a clear liquid. After several minutes additional heating at this temperature the entire mass became clear. Upon cooling to room temperature the liquid solidified to a straw-colored resinous solid which had a softening point of about 70° C.

Example 3

A mixture was prepared containing the following materials:

| | Parts |
|---|---|
| $(DOTG)_2.ZnCl_2$ | 614 |
| Paraformaldehyde | 360 |
| Mercaptobenzothiazole | 2004 |

This mixture was heated at about 80° C. until there was some evidence of fusion. The temperature was then raised to about 90° C. whereupon a yellow opaque paste was formed. Upon continuing the heating at about 100° C., the paste was converted to a clear liquid which solidified at room temperature to a clear resinous solid.

Example 4

A mixture was prepared of the following materials:

| | Parts |
|---|---|
| $(DOTG)_2.ZnCl_2$ | 614 |
| Paraformaldehyde | 180 |
| 2-mercaptothiazoline | 714 |

Upon heating this mixture in a suitable container, a liquid was formed at about 60° C. Heating continued for about 1 hour at 75° C. and the product, on being cooled to room temperature, was a substantially clear balsam.

Example 5

A mixture was prepared of the following materials:

| | Parts |
|---|---|
| $(DOTG)_2.ZnCl_2$ | 1225 |
| Paraformaldehyde | 60 |
| Mercaptobenzothiazole | 334 |

This mixture was fused together by heating at about 105° C. until a substantially clear liquid was formed, which, on cooling to room temperature, became resinous. This resin softens at about 80° C.

Example 6

A product was prepared in generally the same manner as described in Example 2, except that $(DPG)_2.ZnCl_2$ (diphenylguanidine-zinc chloride adduct) was substituted for the $(DOTG)_2.ZnCl_2$. In this case the original mixture contained the following:

| | Parts |
|---|---|
| $(DPG)_2.ZnCl_2$ | 558 |
| Paraformaldehyde | 180 |
| Mercaptobenzothiazole | 1002 |

Upon fusing this mixture together at about 70–80° C., a yellow paste was formed which, upon continued heating at about 100° C. for 20–25 minutes was converted to a clear liquid. The product was then heated for an additional 30 minutes at about 75° C. The liquid, on cooling to room temperature, formed a clear resinous solid which had a softening point of about 70° C.

*Example 7*

A mixture was prepared of the following materials:

| | Parts |
|---|---|
| (DPG)$_2$.ZnCl$_2$ | 1674 |
| Paraformaldehyde | 540 |
| Mercaptobenzothiazole | 3006 |

This mixture was heated from room temperature to 75° C. in about 20 minutes and at which time the mass was partially melted. The temperature was gradually raised reaching about 110° C. about 40 minutes from the start of the reaction. At this point the mixture began to froth somewhat, water vapors being evolved. The reaction was continued at 110° C. for an additional 30 minutes. On cooling to room temperature, a clear resin-like material was obtained in a yield of 96.7% based on the starting materials. This product had a softening point of 70° C.

*Example 8*

To a solution of 409 parts zinc chloride in 200 parts water was added 1266 parts diphenylguanidine. This mixture was heated in 15 minutes to 95° C. and was held at 95–100° C. for about 30 minutes to complete the formation of diphenylguanidine-zinc chloride adduct. A mixture of 54 parts paraformaldehyde and 3006 parts mercaptobenzothiazole was added to the adduct. The resulting mass was gradually heated to 110° C. and held at about that temperature for about 30 minutes. During the latter stages of this reaction, some frothing occurred. The reaction mass was cooled somewhat and then maintained at 80–85° C. for 30 minutes. The product, on cooling to room temperature, was a clear brownish-colored resin-like material having a softening point below 80° C. and otherwise resembling the product of Example 7.

*Example 9*

To a solution of 136.3 parts zinc chloride dissolved in 50 parts water, there was added 422 parts diphenylguanidine. This mixture was slowly heated to 95° C. and held at 95–100° C. for about 30 minutes. To the adduct formed, there was slowly added a mixture of 180 parts paraformaldehyde and 1002 parts mercaptobenzothiazole. The resulting mixture was held at a temperature of about 105–110° C. for 30 minutes and was allowed to cool to room temperature. The clear brownish resin-like mass formed was kept at room temperature for about 60 hours and was then heated to about 80–85° C. at which temperature it was maintained for about 30 minutes. This product, on cooling to room temperature, was generally resinous in appearance.

The last mentioned product, on examination under a microscope showed crystal formation. Upon reheating, this product began to soften at 58–60° C. and formed a clear film at 100° C. On further heating to 110° C. for about 15 minutes, the product became glassy. Portions of this reaction product were crystallized from acetone and also from benzol and on examination under the microscope, it was found that these crystalline materials possessed optical properties different from those of the starting materials, thereby indicating a chemical reaction.

*Example 10*

A solution of 45.5 parts zinc chloride in 17 parts water was mixed with 140.7 parts diphenylguanidine and the mixture was heated in 20 minutes to 105° C. The temperature was maintained at this point for about 18 minutes and in a further period of about 20 minutes there was slowly added a mixture of 60.6 parts of paraformaldehyde (1% excess) and 334.3 parts mercaptobenzothiazole, heating being continued throughout the addition. At about 64 minutes from the start of the initial reaction the temperature had reached 110° C. The temperature was gradually increased until at 100 minutes from the start of the initial reaction, the mass had attained a temperature of 135° C., at which point it was held for an additional 30 minutes. The total time of reaction was about 2 hours 10 minutes.

As in some of the previous examples, the present reaction was attended with some frothing, the frothing and evolution of water vapors ceasing before the end of the 30 minute period of heating at 135° C. On cooling to room temperature, a clear translucent glassy material was formed and this product was still glassy and practically free of crystals after standing for 12 days. This product had a specific gravity of 1.41 and a softening point of 66° C.

*Example 11*

A solution of 47.67 parts zinc chloride (5% excess) dissolved in 20 parts water was mixed with 147.7 parts diphenylguanidine (5% excess). This mixture was heated to 105° C. and held at 105–110° C. for 15 minutes. While heating there was then added a mixture of 60 parts paraformaldehyde and 351 parts mercaptobenzothiazole (5% excess). At about 60 minutes from the start of the initial reaction, the temperature of the reaction mass had reached 110° C. The temperature was gradually increased until at 85 minutes from the start the temperature was 135° C. and it was maintained at this point for about 35 minutes. Frothing and evolution of water vapors were evident at 110° C. and had ceased before the heating period at 135° C. had ended. On cooling to room temperature the reaction product was a clear translucent resin which was similar to the reaction product of Example 10. The softening point of the present resin was 69–70° C.

*Example 12*

A mixture was prepared with the following materials:

| | Parts |
|---|---|
| (DPG)$_2$.ZnCl$_2$ | 1674 |
| Paraformaldehyde | 540 |
| Benzothiazole disulfide | 2988 |

This mixture was fused together in a suitable vessel by heating to about 125° C. and maintaining that temperature until the liquid product became clear and formed a clear film when flowed out upon a suitable support. On cooling to room temperature, the reaction product solidified to a brownish-colored resin which had a softening point of about 70° C.

Example 13

A mixture was prepared with the following materials:

| | Parts |
|---|---|
| (DPG)₂ZnCl₂ | 1116 |
| Paraformaldehyde | 540 |
| Benzothiazyldisulfide | 1992 |
| Mercaptobenzothiazole | 1002 |

This mixture was fused together by heating it to a temperature of about 105° C. The temperature was slowly raised to 115° C. and the reaction mass was maintained between 115–120° C. for 30 minutes. The resultant product, cooled to room temperature, was a clear brownish resin.

Example 14

To a solution of 410 parts zinc chloride in 200 parts water was added 1266 parts diphenylguanidine. This mixture was slowly heated to 105° C. and was held at 105° C. for about 15 minutes to complete the formation of the diphenylguadidine-zinc chloride adduct. A mixture of 270 parts paraformaldehyde and 3009 parts of mercaptobenzothiazole was added to the adduct. The resulting mass was gradually heated to 120° C. and held at about that temperature for about 30 minutes, during which time frothing and evolution of water vapor ceased. The reaction mass was cooled forming a clear brownish-colored resin-like material, having a softening point of about 60° C.

The products prepared as above described appear to be chemical compounds of complex molecular structure, having softening points which vary from about 60° to less than 80° C. These products are chemically different from fusion mixtures of the diarylguanidine-zinc chloride adducts and mercaptobenzothiazole which are opaque yellow-colored solids and which, when examined under the microscope, clearly show the glassy phase of the diarylguanidine-zinc chloride adducts and the crystalline phase of the mercaptobenzothiazole. Furthermore, these latter fusion mixtures have softening points ranging from about 81–108° C., depending on the fusing conditions. These softening points are substantially higher than those of the products of the present invention.

My new chemical products are useful as intermediates for the production of complex chemical compounds for use as flotation reagents and the like. They are especially valuable as vulcanization accelerators for rubber and synthetic rubber-like materials as described in my co-pending application for United States Letters Patent, Serial No. 486,204, filed of even date, which has issued as Patent No. 2,397,409.

As will be seen from the examples, the conditions for producing the desired complexes may be varied quite considerably without substantially affecting the properties of the products obtained. Starting with the same ingredients, there will be produced in general, the same chemical complex. By suitable methods of preparation, the end products may be made as resins or may be obtained as crystalline compounds. It should be noted that so far as the products are concerned there is no distinction between first reacting the thiazole with formaldehyde and then with the diarylguanidine-acid salt adduct as in Example 1, and reacting the adduct, thiazole and aldehyde simultaneously as in the remaining examples. Because it is simpler, the latter is preferred.

In place of the zinc chloride referred to, other metal chlorides or sulfates may be used as described in my patents referred to above. The acidic salts of organic acid may also be used, i. e., acetates, oxalates, maleates and the like. These metal salts include zinc sulfate, zinc oxalate, zinc acetate, zinc maleate, aluminum sulfate, hydrated aluminum chloride, cadmium chloride, cadmium sulfate, stannous chloride, stannic chloride, stannous sulfate and stannic sulfate. Other suitable diarylguanidines may be used, e. g., phenylorthotolylguanidine.

Other changes and variations may be made in carrying out the present invention without departing from the spirit and scope thereof as defined in the appended claims.

I claim:

1. A process of preparing a chemical complex which comprises heating an adduct of a diarylguanidine and an acidic salt of a metal selected from the group consisting of zinc, aluminum, cadmium and tin with a reaction product of formaldehyde and a thiazole derivative selected from the group consisting of mercaptobenzothiazole, benzothiazole disulfide and mercaptothiazoline for a sufficient time to substantially complete the formation of a stable complex.

2. A process of preparing a chemical complex which comprises fusing an adduct of a diarylguanidine and an acidic salt of a metal selected from the group consisting of zinc, aluminum, cadmium and tin with a mixture of paraformaldehyde and a thiazole derivative, selected from the group consisting of mercaptobenzothiazole, benzothiazole disulfide and mercaptothiazoline and heating the fused mixture for a sufficient time to substantially complete the reaction of the fused components to form a stable chemical complex.

3. A process of preparing a chemical complex which comprises fusing a mixture of one part of an adduct of a diarylguanidine and an acidic salt of a metal selected from the group consisting of zinc, aluminum, cadmium, and tin with from about one to twelve parts of a reaction product of formaldehyde and a thiazole derivative selected from the group consisting of mercaptobenzothiazole, benzothiazole disulfide and mercaptothiazoline and heating the fused mixture for a sufficient time to substantially complete the reaction of the fused components to form a stable chemical complex.

4. A process according to claim 3 in which the acidic salt is zinc chloride.

5. A process according to claim 3 in which the acidic salt is zinc chloride and the reaction product is methylol mercaptobenzothiazole.

6. A process of preparing a chemical complex which comprises fusing a mixture of one part of an adduct of a diarylguanidine and an acidic salt of a metal selected from the group consisting of zinc, aluminum, cadmium, and tin with six parts of a reaction product of approximately equal parts of formaldehyde and a thiazole derivative selected from the group consisting of mercaptobenzothiazole, benzothiazole disulfide and mercaptothiazoline and heating the fused mixture for a sufficient time to substantially complete the reaction of the fused components to form a stable chemical complex.

7. A stable chemical complex prepared by fusing a mixture of one part of an adduct of a diaryguanidine and an acidic salt of a metal selected from the group consisting of zinc, aluminum, cadmium and tin with from about one to twelve parts of a reaction product of formaldehyde and a thiazole derivative selected from the group consisting of mercaptobenzothiazole, benzothiazole disulfide and mercaptothiazoline and heating the fused mixture for a sufficient time to substantially complete the reaction of the fused components to form a stable chemical complex.

8. A stable chemical complex prepared by fusing one part of a diarylguanidine-zinc chloride adduct and one to twelve parts of methylol mercaptobenzothiazole and heating the fused mixture until the reaction of the fused components to form a stable complex is substantially completed.

9. A stable chemical complex prepared by fusing one part of a diarylguanidine zinc chloride adduct with six parts of methylol mercaptobenzothiazol and heating the fused mixture until the reaction of the fused components to form a stable complex is substantially completed.

10. A process of preparing a chemical complex which comprises heating an adduct of a diarylguanidine and an acidic salt of a metal selected from the group consisting of zinc, aluminum, cadmium and tin with substances selected from the group consisting of a reaction product of formaldehyde and a thiazole derivative and a mixture of paraformaldehyde and a thiazole derivative, said thiazole derivative selected from the group consisting of mercaptobenzothiazole, benzothiazole disulfide and mercaptothiazoline for a sufficient time to substantially complete the formation of a stable complex.

ARNOLD R. DAVIS.